July 8, 1958 H. P. BIRMINGHAM 2,841,884
RADAR TRACKING DEMONSTRATING AND TRAINING INSTRUMENT
Original Filed May 11, 1951 6 Sheets-Sheet 1

FIG. 1

INVENTOR.
HENRY P. BIRMINGHAM
BY
ATTORNEYS

INVENTOR.
HENRY P. BIRMINGHAM

FIG. 6

United States Patent Office 2,841,884
Patented July 8, 1958

---

2,841,884

RADAR TRACKING DEMONSTRATING AND TRAINING INSTRUMENT

Henry P. Birmingham, Washington, D. C., assignor, by mesne assignments, to the United States of America as represented by the Secretary of the Navy Original application May 11, 1951, Serial No. 225,768, now Patent No. 2,777,214, dated January 15, 1957. Divided and this application June 30, 1952, Serial No. 296,336

5 Claims. (Cl. 35—10.4)

The present invention relates generally to an instrument for training personnel in the art of radar tracking and for demonstrating the operation of radar tracking instruments, and is a division of application Serial No. 225,768, filed May 11, 1951, now Patent 2,777,214, and related to application Serial No. 296,335, filed June 30, 1952, now Patent 2,791,643. The present instrument is so designed as to closely simulate the operation of an actual train-elevation tracking radarscope, both in the results obtained therefrom and in the operation thereof.

In its general aspects, the instrument comprising the present invention is designed to operate in conjunction with a cathode ray tube whose screen is caused to simulate functionally the screen of an actual train-elevation tracking radarscope. A target tracking circuit is provided which enables a trainee to track an imaginary target pursuing an imaginary course through visual observation of a cathode ray beam spot on the cathode ray tube screen (as in actual train-elevation tracking radarscopes), through the manipulation of train and elevation controls such as dials or the like. The course of an imaginary target is fed into the cathode ray tube as an electrical signal, varying in accordance with a desired course pattern, to impress varying tracking signals across the two pairs of cathode ray beam deflecting plates of the cathode ray tube and to cause a vertical and/or horizontal deflection of the cathode ray beam spot on the cathode ray tube screen, representing the resultant of the train and/or elevation components of a desired target course. Proper manipulation of the control dials by the trainee results in a decrease in the signals thus applied across the beam deflecting plates to decrease the deflection of the cathode ray beam spot. Thus, the imaginary course of an imaginary target is represented by a deflection of the cathode ray beam or target tracking spot, while the trainee attempts to track the imaginary target along its course by manipulation of the control dials to maintain the spot at or close to its zero deflection point.

In order to determine the proficiency of a trainee in tracking an imaginary target, the present instrument is provided with a scoring system, which operates to define an accurate tracking area on the cathode ray tube screen. So long as the trainee is tracking the imaginary target with sufficient accuracy to keep the tracking spot within the accurate tracking area so defined, the scoring system registers accurate tracking; while if the tracking error is so great as to cause the tracking spot to exceed the limits of said area, the scoring system stops registering. Thus, there is provided a determination of the portion of the tracking time during which accurate tracking was obtained.

It is therefore, one object of the present invention to provide an instrument for training in and demonstrating radar tracking which simulates the conditions of actual radar tracking in train and elevation and the operation of an actual train-elevation tracking radarscope.

Another object of the present invention is to provide an instrument for training and demonstrating radar tracking which enables a trainee to track an imaginary target along an imaginary target course in a manner similar to actual radar tracking.

A still further object of the present invention is to provide a scoring system which, when operating in conjunction with such an instrument as aforementioned, functions to approximate a circular area, in the form of a substantially regular octagon, upon the cathode ray tube screen as an accurate tracking area, to register accurate tracking when the target tracking spot is within the area so defined.

Having thus indicated in a general way the purposes, objects, functions, and operation of the present invention, a more adequate understanding thereof can be had from a consideration of the detailed description of one embodiment of the present invention made hereinbelow in conjunction with the accompanying drawings, in which like reference characters refer to like or corresponding parts and wherein:

*Tracking circuit*

Figure 1:
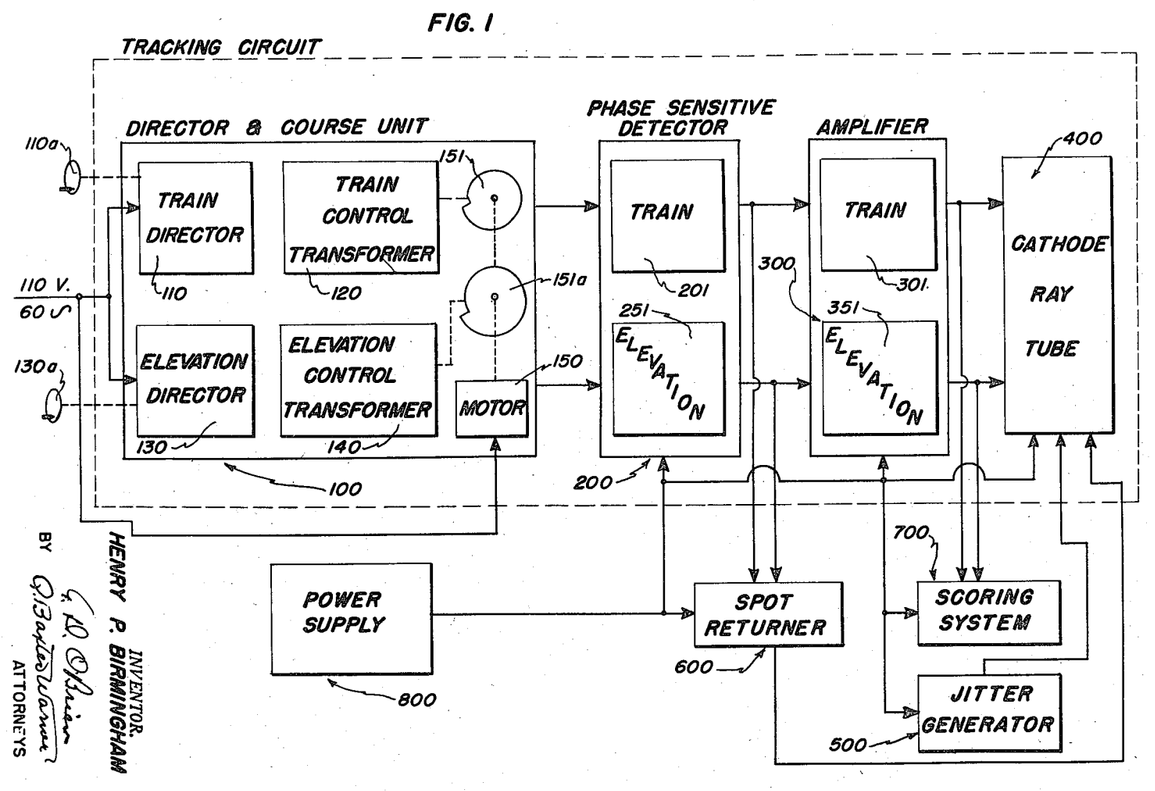
Fig. 1 is a schematic block diagram of the several components of the present instrument and schematically illustrates their interrelation.

The tracking circuit of the present instrument in general comprises a director and course unit 100, whose output is fed into a phase sensitive detector 200, the output of which is amplified in the amplifier 300 and then fed to the beam deflecting plates of the cathode ray tube 400, as illustrated in the block diagram Fig. 1. This circuit is made up of two substantially identical systems, one for tracking in train and the other for tracking in elevation, the resultant output of each being applied to a different pair of cathode ray tube beam deflecting plates. The director and course unit 100 comprises two pairs of synchronously connected generators connected to form two control transformer systems, one pair including the train director 110 and the train control transformer 120, while the other pair includes the elevation director 130 and the elevation control transformer 140. Train course cam 151 and elevation course cam 151a and their operating motor 150 are included in the director and course unit. These cams are mechanically connected to the rotors of the train and elevation control transformers 120 and 140 respectively, and operate to establish an imaginary target course for the trainee to track. As these cams are driven by the motor, desired rotational patterns of the control transformer rotors are obtained in accordance with the contours of the cams, and as the rotors are moved out of synchronous relationship with the positions of the rotors in their respective director units 110 and 130, separate train and elevation signals are generated in accordance with the nonsynchronous displacement of each of the control transformer rotors with respect to its corresponding director rotor. The signals thus generated are fed into the phase sensitive detector 200, the train signal being fed into the train portion 201 of the detector and the elevation signal into the elevation portion 251, where the phase of the signals generated by the director and course unit are determined to establish the direction of nonsynchronous displacement between the corresponding directors and control transformers. The train output of the phase sensitive detector is then amplified in the train portion 301 of amplifier 300, and the elevation output is amplified in the elevation portion 351 thereof before being applied to their respective pairs of cathode ray tube beam deflecting plates. A cathode ray beam spot or visual tracking reference on the cathode ray tube screen is thus deflected from an established central position or null point in accordance with the nonsynchronous displacement of the train and elevation control transformer rotors with respect to their corresponding director rotors and the signals resulting therefrom. The trainee observes the deflection of the spot on the cathode ray tube screen, representing a target course, and attempts to follow this course by keeping the spot in the central portion of a reticle or area defined on the cathode ray tube screen. This tracking is accomplished by the trainee manipulating train and elevation control dials 110a and 130a or other control means to rotate the train and elevation director rotors, respectively. Proper manipulation of these dials operates to rotate the director rotors into synchronous position with the displaced control transformer rotors, thereby reducing the director course unit output signal, and hence reducing the deflection of the spot or reference on the cathode ray tube screen. Thus, as an imaginary target course is described by the action of the course cams and their motor on the control transformer rotors and is observed by the position of the spot on the cathode ray tube screen, the trainee attempts to maintain an "on-target" positioned by manipulation of the train and elevation control dials to cause the train and elevation director rotors to follow this course.

Figure 2:
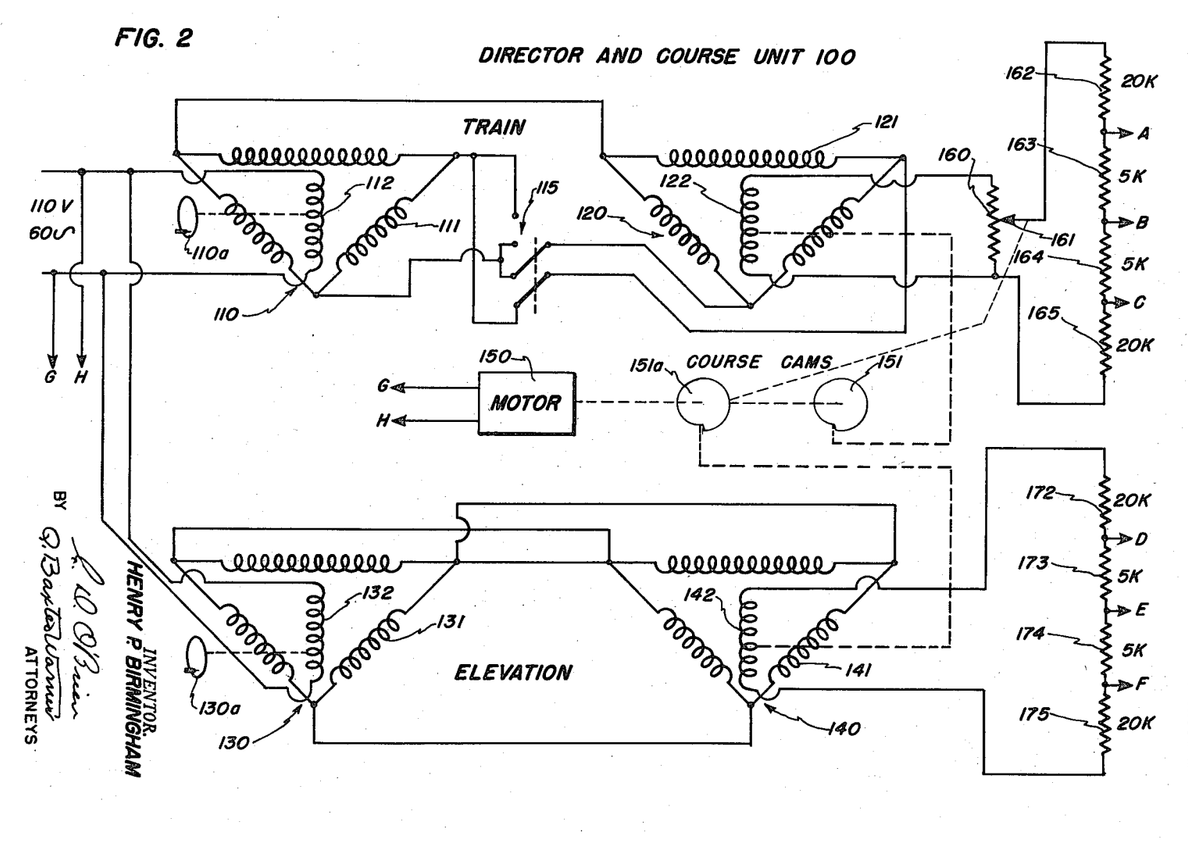
Figs. 2, 3, 4, 5 and 6 are detailed wiring diagrams of the director and course unit, the phase sensitive detector unit, the differential amplifier, the cathode ray tube and the scoring system of the present invention as indicated on the several drawings.

Considering the tracking circuit in detail, and for this purpose referring first to the detailed wiring diagram of the director and course unit shown in Fig. 2, the stator 111 of the train director 110 is synchronously connected through the reversing switch 115 to the stator 121 of the train control transformer 120, and an A. C. voltage is impressed across the rotor 112 of the train director to form a conventional control transformer system. When the position of rotor 122 is synchronized with that of rotor 112, no voltage is impressed across the former. Energization of the course cam motor 150 causes a rotation of the rotor 122 of the train control transformer 120, as determined by the train course cam 151, to a nonsynchronous position with respect to the director rotor 112, resulting in an A. C. voltage being impressed across the rotor 122 in accordance with the nonsynchronous displacement, the phase of said voltage being determined by the direction of nonsynchronous displacement. The voltage thus produced is impressed across the potentiometer 160, and a portion is tapped therefrom and applied across the series of resistors 162, 163, 164, and 165. The purpose of the reversing switch 115 is to enable the cam 151 to present two target courses in train, either from left to right or right to left, for a single cam contour. The purpose of the potentiometer 160 is to divide the train control transformer output to provide a conversion from train to traverse as is necessary for different target elevations. The potentiometer tap 161 is therefore mechanically linked to the elevation course cam 151a to continuously accomplish this conversion as the elevation of the imaginary target course is varied. The elevation portion of the director and course unit is substantially identical to the train portion, comprising the elevation director 130, whose stator 131 is synchronously connected to the stator 141 of the elevation control transformer 140 and whose rotor 132 is connected to the same voltage supply as the train director rotor 112. The output of the rotor 142 of the elevation control transformer 140 resulting from nonsynchronous relationship between the two rotors 132 and 142, as caused by rotation of the elevation course cam 151a, is impressed across the series of resistors 172, 173, 174 and 175. The only differences existing between the train and elevation director and course systems is the absence of a reversing switch between the elevation director and the elevation control transformer (which may be supplied if desired) and of a potentiometer in the elevation control transformer output circuit. Thus, upon the energization of the course cam motor 150, an imaginary target course is defined by rotation of the train and elevation control transfomer rotors 122 and 142, as controlled by the contours of the course cams 151 and 151a. As the trainee attempts to track the course so described by manipulating the control dials 110a and 130a to rotate the director rotors 112 and 132 in synchronism with the control transformer rotors 122 and 142, an output is obtained from the train and elevation control transformer rotors in accordance with the train and elevation tracking errors, or in accordance with the nonsynchronous displacements between the director rotors and their corresponding control transformer rotors. Error signal voltages are thus produced and impressed across the above-mentioned two series of resistors for the corresponding portions of the director and course unit. If desired, a greater correction of tracking error per unit turn of the elevation control dial than of the train control dial may be had, or vice versa when it is considered advantageous, by appropriately gearing the dials to their respective director rotors.

Figure 3:
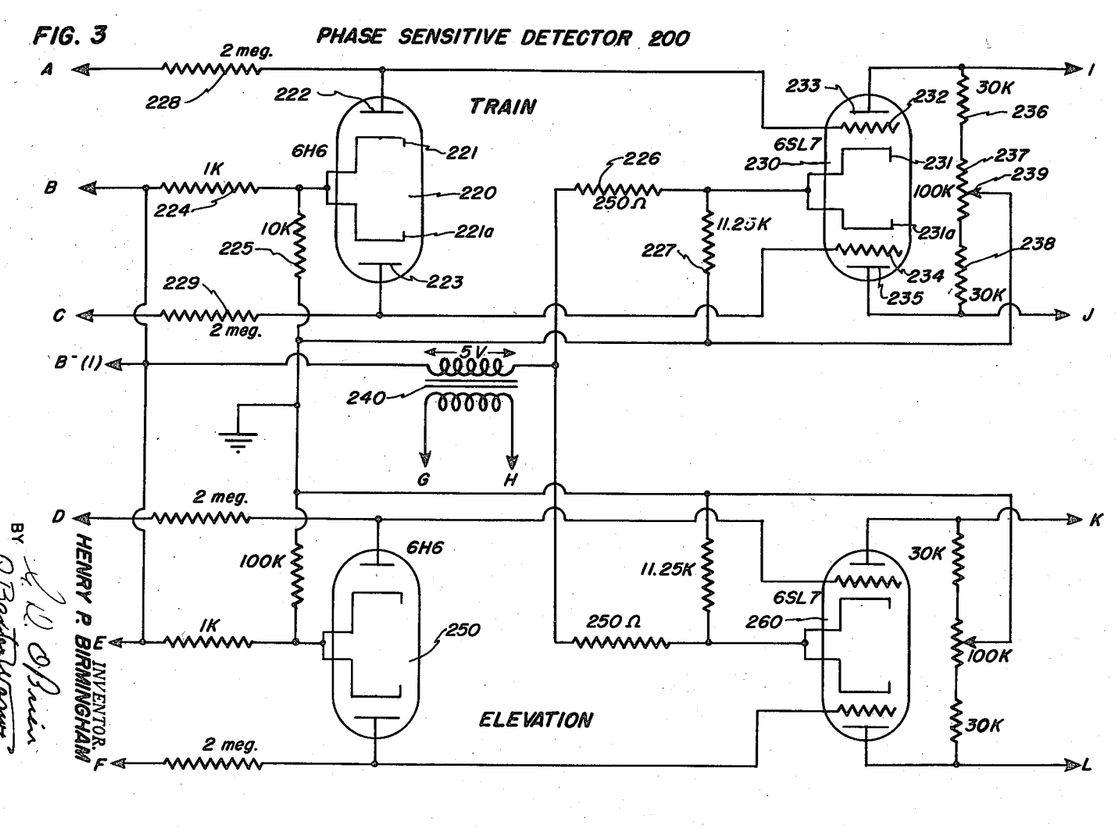

The error signals of the director and course unit, as tapped off at points A, B, and C for train and points D, E, and F for elevation, are applied to the phase sensitive detector unit as indicated in the detailed wiring diagram thereof in Fig. 3. Considering the train portion of the detector, it includes the two vacuum tubes 220 and 230: tube 220 being a twin diode having the cathodes 221 and 221a and the plates 222 and 223, functioning as a voltage limiter for the train portion of the detector circuit; tube 230 being a twin triode having the cathodes 231 and 231a, the grids 232 and 234, and the plates 233 and 235, functioning as a phase detector for the train portion of the phase sensitive detector unit. The limiter tube 220 is biased by means of the B—(1) supply to make the plates 222 and 223 thereof more negative than the cathodes 221 and 221a, as determined by the ratio of the resistors 224 and 225, leaving the tube 220 nonconductive when no tracking error voltage is applied to the points A, B, and C. When an A. C. voltage signal is generated across the train control transformer rotor 122, an A. C. voltage is impressed thereby across the series of resistors 162, 163, 164, and 165, and during one half of such an alternating voltage cycle the point A attains a more positive and the point C a more negative potential than point B, while during the other half of the cycle point C attains a more positive and point A a more negative potential than point B. So long as the potential difference between points C and B and between points A and B is small, or so long as the voltage generated across the train control transformer rotor 122 is small, the above-mentioned B— bias on the tube 220 is not overcome and the tube remains nonconductive, permitting the potentials of the plates 222 and 223 to fluctuate with respect to point B in direct correspondence with the tracking error signal. However, when the potential at point A or C exceeds a determined positive value with respect to that at point B, as may be caused by a large train tracking error, the B— bias is overcome on that half of the limiter tube 220, and this tube then becomes conductive to the plate at that relative positive potential; and once conductive, despite any increase in positive potential at the particular point A or C, the potential of the plate on the conducting side of the limiter tube 220 remains substantially constant with respect to the potential at point B so long as point A or C exceeds the conduction potential. As a practical matter, since the tracking error signal is an A. C. voltage, when it exceeds the above indicated limit value, the tube 220 becomes conductive to both plates alternately in correspondence with the voltage cycle alternations. Thus, the limiter tube 220 functions to limit the potential differences between plate 222 and point B and between plate 223 and point A to a peak beyond which they cannot increase substantially despite an increase in tracking error. This limiting potential difference is determined by the initial bias or potential difference impressed upon the plates and cathodes of limiter tube 220.

Referring to detector tube 230, the B—(1) supply establishes the plates 233 and 235 at approximately ground potential, the grids 231 and 234 at approximately B—(1) potential, and the cathodes 231 and 231a at a value intermediate that of the grids and plates as determined by resistors 226 and 227. A stepdown transformer 240 is connected at points G and H to the A. C. voltage supply fed to the director and course unit, and the voltage from the secondary thereof is superimposed upon the B— potential fed to the cathodes of tube 230 to shift their potential with respect to their grids and plates in accordance with this superimposed voltage fluctuation. Assuming for the moment zero signal voltage from the control transformer 120, the alternating voltage impressed upon the secondary of the transformer 240 operates on one half of the voltage cycle to shift the cathodes 231 and 231a of the tube 230 more negative, the magnitude of negative shift of the cathodes being determined by that of the secondary voltage and the ratio of the resistor 226 to the resistor 227, and on the other half of the voltage cycle to shift said cathodes more positive by a like amount, although the grids at all times remain negative with respect to the cathodes. The values of this circuit are so chosen as to cause a small flow of current through tube 230 to both plates equally during the portion of the superimposed A. C. cycle which shifts the cathode potential more negative than its D. C. level.

Upon the occurrence of a train tracking error signal, during one half of the error signal voltage cycle point A is negative with respect to point B, and point C is positive with respect thereto, thus shifting the grid 232 more negative and the grid 234 more positive than their D. C. bias, and if during that half of this signal voltage cycle the voltage impressed upon the secondary of the transformer 240, which is in time phase with the control transformer produced signal, is such as to shift the cathodes 231 and 231a more negative than its D. C. level, an increased electron current flow occurs from the cathode 231a to the plate 235 while the current flow from cathode 231 to plate 233 is decreased or completely extinguished. During the next half of the signal and transformer voltage cycle, point C becomes negative with respect to point B and point A becomes positive with respect thereto, causing the grid 232 to shift more positive and the grid 234 more negative than their D. C. bias; but because of the time phase relationship between the transformer voltage and the signal voltage, the transformer produced voltage is operating during this half of the cycle to shift the cathodes more positive than their D. C. level, hence counterbalancing the effect of the signal voltage and preventing the flow of any electron current from the cathodes to the plates. The tube 230 therefore becomes nonconductive during this half of the voltage cycle. If the train tracking error is in the reverse direction, the phase of the control transformer signal voltage is inverted, and as is apparent from the foregoing description of the present circuit, the phase detector tube 230 becomes increasingly conductive during one half of each A. C. voltage cycle from its cathode 231 to its plate 233, rather than from cathode 231a to the plate 235 as in the above description. Thus, the tube 230 operates to detect the train tracking error signal and to indicate the direction of tracking error. Due to the above-described action of the limiter tube 220, a limit is established on the extent to which the grids 232 and 234 may shift in a positive direction from their D. C. bias as a result of tracking error signal, hence the current flow from the cathodes to the plates of tube 230 is accordingly limited, limiting the maximum error signal passed by the phase sensitive detector unit 200.

Thus, when the error signal generated by the train control transformer 120 is in such a direction as to cause increased D. C. current to flow intermittently from the cathode 231a to the plate 235 of the detector tube 230, the increased current flow through the resistor 238, potentiometer 237, and the tap 239 to ground causes point J to become more negative than point I. When the train tracking error is in the opposite direction, the resultant error voltage phase inversion causes increased intermittent D. C. current to flow from the cathode 231 to the plate 233, and hence the increased current flow through the resistor 236, potentiometer 237, and the tap 239 to ground causes point I to become more negative than point J. Therefore, upon the occurrence of a train tracking error, a pulsating intermittent D. C. potential difference is created between points I and J, whose magnitude is dependent upon the magnitude of train tracking error up to a maximum limit established by the characteristics of the limiter tube 220 and its circuit, in a direction determined by the direction of the train tracking error and established by the operation of the phase detector tube 230 and its circuit. The potentiometer 237 and its variable tap 239 are provided to establish an exact balance in the resistance bridge across the plates 233 and 235 of tube 230 and to compensate for any unequal output of the two halves of tube 230 when no train tracking error signal voltage is impressed at points A, B, and C.

The elevation portion of the phase sensitive detector circuit is identical to the train portion described above, comprising the limiter tube 250 and the phase detector tube 260, functioning upon the application of an elevation tracking error signal to the points D, E, and F in the same manner as the corresponding tubes 220 and 230 in the train portion of the circuit to create a potential difference between the points K and L.

Figure 4:
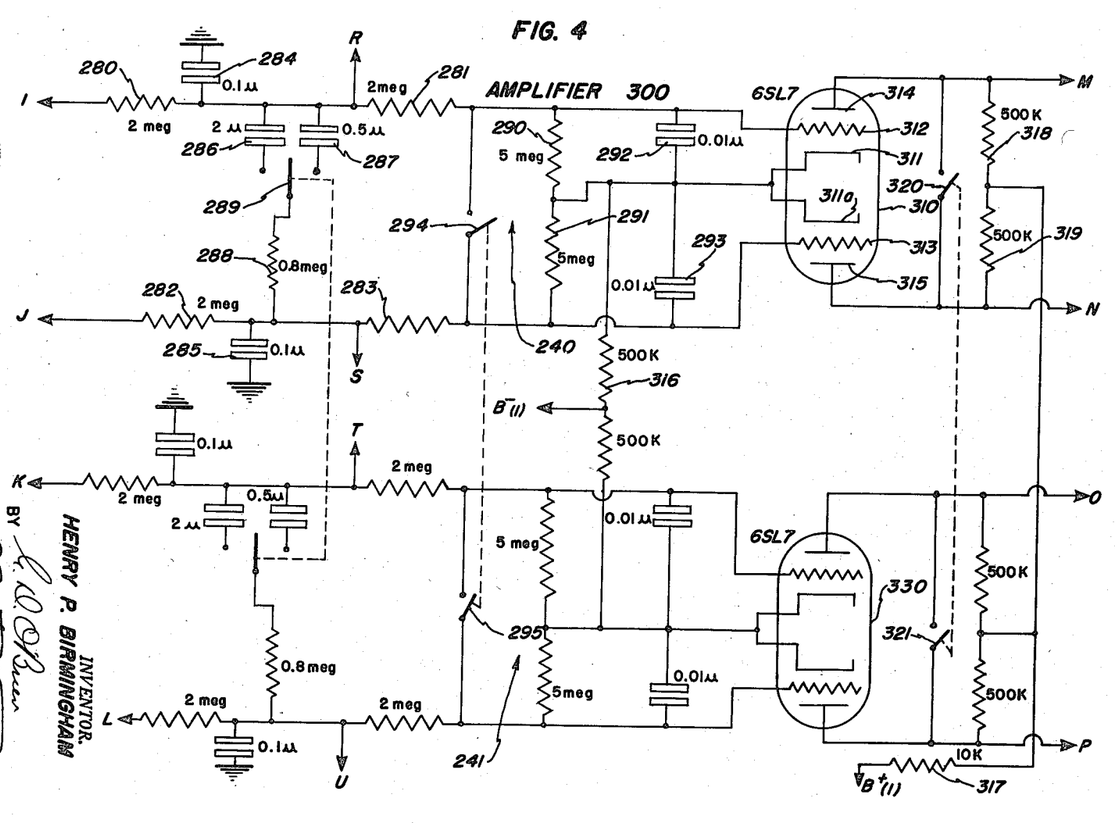

The intermittent pulsating voltage outputs of the phase sensitive detector unit at points, I, J, K, and L are applied to the amplifier 300 through its input bridges 240 and 241, shown in the detailed wiring diagram Fig. 4. Considering in detail the train portion of the amplifier, it comprises the twin triode amplifier tube 310, having the cathodes 311 and 311a, the grids 312 and 313, the plates 314 and 315, and the cathode load resistor 316. The B—(1) supply is connected to the cathodes 311 and 311a through the cathode load resistor 316, to the grids 312 and 313 through the resistors 290 and 291, and to points I and J and the plates 233 and 235 of detector tube 230 (see Fig. 3) through the amplifier input bridge 240, although having a negligible effect on the latter because of the large impedance of the bridge 240, while the B+(1) supply is connected to the plates 314 and 315 through the plate load resistors 317, 318, and 319. The values of the B supplies and of the elements of this circuit are so chosen as to establish the cathodes 311 and 311a at approximately ground potential and at a positive potential with respect to the grids 312 and 313, and to establish the tube 310 with a desired flow of electrons from its cathodes 311 and 311a to its plates 314 and 315 respectively. Upon the occurrence of a train tracking error, the potential difference resulting between points I and J from the operation of the phase detector tube 230 is applied across amplifier tube grids 312 and 313, after being smoothed into a substantially steady D. C. potential by means of the filters comprising resistor 280 and condenser 284 connected to ground and resistor 282 and condenser 285 connected to ground. Upon the occurrence of a negative potential shift at point I and a positive shift at point J as a result of a train tracking error, the potential on grid 312 of the tube 310 is correspondingly shifted in negative direction to decrease the electron flow from cathode 311 to plate 314 while grid 313 is correspondingly shifted in a positive direction but by a less amount than the shift of grid 312 (because the potential shifts at points I and J are not of equal magnitude) to increase current flow from cathode 311a to plate 315. The amplifier tube 310 being connected to function as a cathode follower, the potential on the connected cathodes 311 and 311a is accordingly shifted in a negative direction resulting in a greater flow of electrons from the cathode 311a to the plate 315 of tube 310 than would result solely from the positive potential shift of grid 313. The potential on plate 315 and at point N therefore shifts in a negative direction while that on plate 314 and at point M correspondingly shifts in more positive direction. If the train tracking error is in such direction as to result in negative increase of potential at point J and a positive increase at point I, it is therefore apparent from the foregoing analysis that the potential on plate 314 and at point M shifts in a negative direction and that on plate 315 and at point N correspondingly shifts in a positive direction. This amplifier, therefore functions substantially as a true differential amplifier when the impedance for each half of its output bridge comprising resistors 318 and 319 are equal, causing substantially equal but inverse variations in its two plate potentials for a signal applied to one of its control grids. The condensers 292 and 293 connected across the resistors 290 and 291, respectively, function to further steady the linearity of the voltages applied to the cathodes and grids of tube 310.

If desired, either of the condensers 286 or 287 of different capacitance values may be connected across the amplifier tube feed-in bridge 240 through the resistor 288 and the selector switch 289, cooperating with resistors 281 or 283 to damp partially variations in the potential difference between points I and J or to damp partially the effect of variations in train tracking error. When the values for condensers 286 and 287 and resistors 288 and 281 or 283 are properly chosen, a desired fraction of potential difference change between points I and J is damped, thereby resulting in the simulation of automatic lead of the target as is frequently employed in gun director systems. As the trainee adjusts the train director to compensate for movement of the target and eliminate a tracking error signal, the initial potential difference change between points I and J are damped and no noticeable effect is had on the cathode ray tube screen, corresponding to the lag of the gun director with respect to the gun to provide the lead angle. Variations in rate of manipulations of the train director 110 are correspondingly affected to simulate the effect of automatic lead angle.

The elevation portion of the amplifier circuit is identical to the above-described train portion, comprising the twin triode amplifier tube 330, an input bridge 241 therefor, and an output bridge therefor. The elevation portion of this circuit thus functions in a manner identical to the train portion, so that the application of a negative potential at point K with respect to point L resulting from elevation tracking error and the operation of the phase detector tube 260 causes the potential at point P to shift in a negative direction and that at point O to shift in a positive direction, while the application of negative potential at point L with respect to point K causes the potential at point O to shift in a negative direction and that at point P to shift in a positive direction. Amplifier tube 330, therefore, also functions as a differential amplifier in the same manner as tube 310. Thus, upon the occurrence of a tracking error either in train or elevation, the direction of the error is established by the phase sensitive detector circuit, and the error signal issuing from the detector is then amplified in the amplifier circuit to establish a potential difference between points M and N for train tracking error and points O and P for elevation tracking error, the direction of the potential difference in each case depending upon the direction of tracking error of the respective tracking phase.

Figure 5:
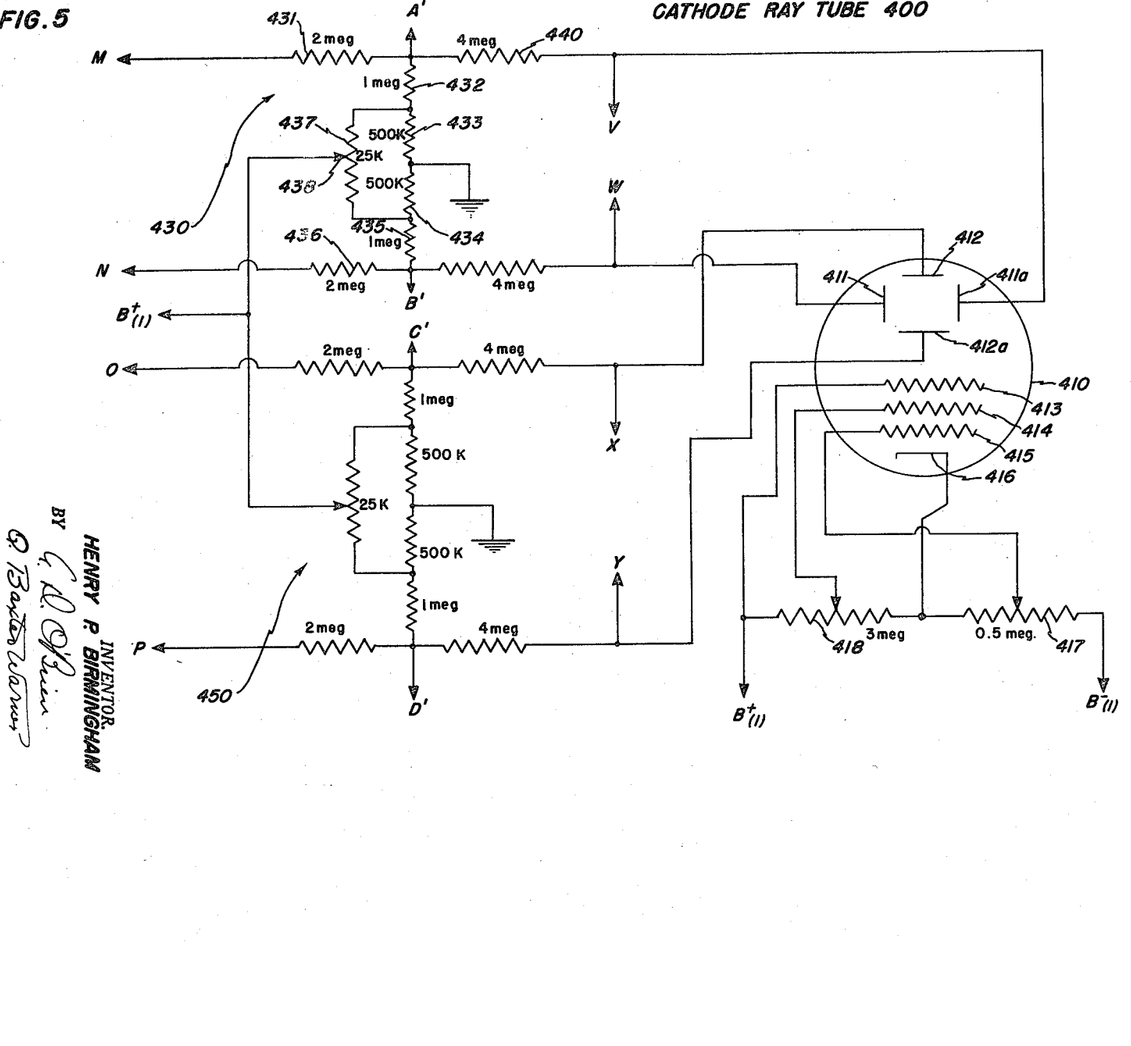

The cathode ray tube unit 400, shown in detail in Fig. 5, like the above-described units of the tracking circuit, is divided into two identical parts: the train error signal portion, including the horizontal beam deflecting plates 411 and 411a of the cathode ray tube 410, and the elevation error signal portion, including the vertical beam deflecting plates 412 and 412a of the cathode ray tube. Considering the cathode ray tube train input bridge 430 in detail, it comprises the resistor 431 connected to point M, resistors 432, 433, 434, and 435, and the resistor 436 connected to point N. The points M and N are established at a desired potential level as determined by the zero train tracking error output of the amplifier tube 310, thus establishing the horizontal beam deflecting plates 411 and 411a at substantially equal and determined potential levels. However, if due to a slight unbalance in the input bridge 430 the potential thus established on the horizontal beam deflecting plates 411 and 411a are not equal, this inequality may be overcome by the application of the B+(1) potential to the subsidiary bridge comprising the resistors 437, 433, and 434 through the variable tap 438 on resistor 437, to establish the cathode ray beam spot at the horizontal center of the tracking reticle on the cathode ray tube screen, which operation will be described subsequently. Upon the occurrence of a potential difference between points M and N, as would result from an error in train tracking, the error is indicated on the cathode ray tube screen by a corresponding horizontal deflection of the cathode ray beam or target tracking spot from its horizontal null point, resulting from the unequal potentials impressed upon the horizontal beam deflecting plates. Thus, any error in train tracking is represented by a horizontal deflection of the cathode ray beam spot on the cathode ray tube screen, with the direction of error as established by the phase sensitive detector unit determining the direction of the deflection. The elevation cathode ray tube input bridge 450 and its subsidiary zeroing bridge are identical to the train input and subsidiary bridges, and operate in a corresponding manner upon the vertical beam deflecting plates 412 and 412a of the cathode ray tube, to indicate the elevation tracking error by a vertical deflection of the cathode ray beam spot in a direction corresponding to the tracking error direction established by the elevation tracking error signal impressed upon the elevation input bridge 450 at points O and P. The operating potentials on the anode 413, the cathode 416, and the focus and intensity grids 414 and 415 respectively, of the cathode ray tube are established by the B−(1) and B+(1) potential sources applied across the resistors 417 and 418.

In order to effect a proper zeroing of the cathode ray beam spot in the tracking reticle on the cathode ray tube screen, the resistors 290 and 291 and plates 314 and 315 of tube 310 in the train portion of the tracking circuit and the corresponding elements in the elevation portion are shunted by closure of tied switches 294 and 295 and tied switches 320 and 321. Closure of the first mentioned pair of switches results in substantially equal potentials being applied to the grids of the two amplifier tubes, and closure of the second mentioned pair of switches insures substantially equal potentials at points M and N and at points O and P, despite any unbalance in operation of the amplifier tubes or inequality in their output bridges. This being done, the outputs of the subsidiary bridges in the cathode ray tube input circuits may be adjusted by their variable taps to position the cathode ray beam spot centrally, both vertically and horizontally, in the reticle on the cathode ray tube screen, placing the cathode ray tube circuit in readiness for operation in the tracking circuit.

Scoring system

In order to determine how effectively the trainee is tracking the imaginary target along its imaginary course, the present device is provided with a scoring system generally indicated by the numeral 700. As previously mentioned, the object in operating the present tracking circuit is to follow the imaginary course of a target as established by the course cam 151 and its motor 150 and as indicated by the cathode ray beam spot on the screen of the cathode tube 410, the tracking errors being indicated by appropriate deflections of this target tracking spot from its zero or central position within the reticle on the cathode ray tube screen. To determine the accuracy of the trainee's tracking over a period of time, the present scoring system energizes a scoring clock so long as the error signal delivered by the amplifier to the cathode ray tube deflecting plates is not great enough to cause a beam deflection beyond desired established limits within the reticle. To this end, the output voltages of the amplifier at points M and N for train and O and P for elevation errors respectively, are applied to the scoring system circuit illustrated in detail in Fig. 6.

Figure 6:
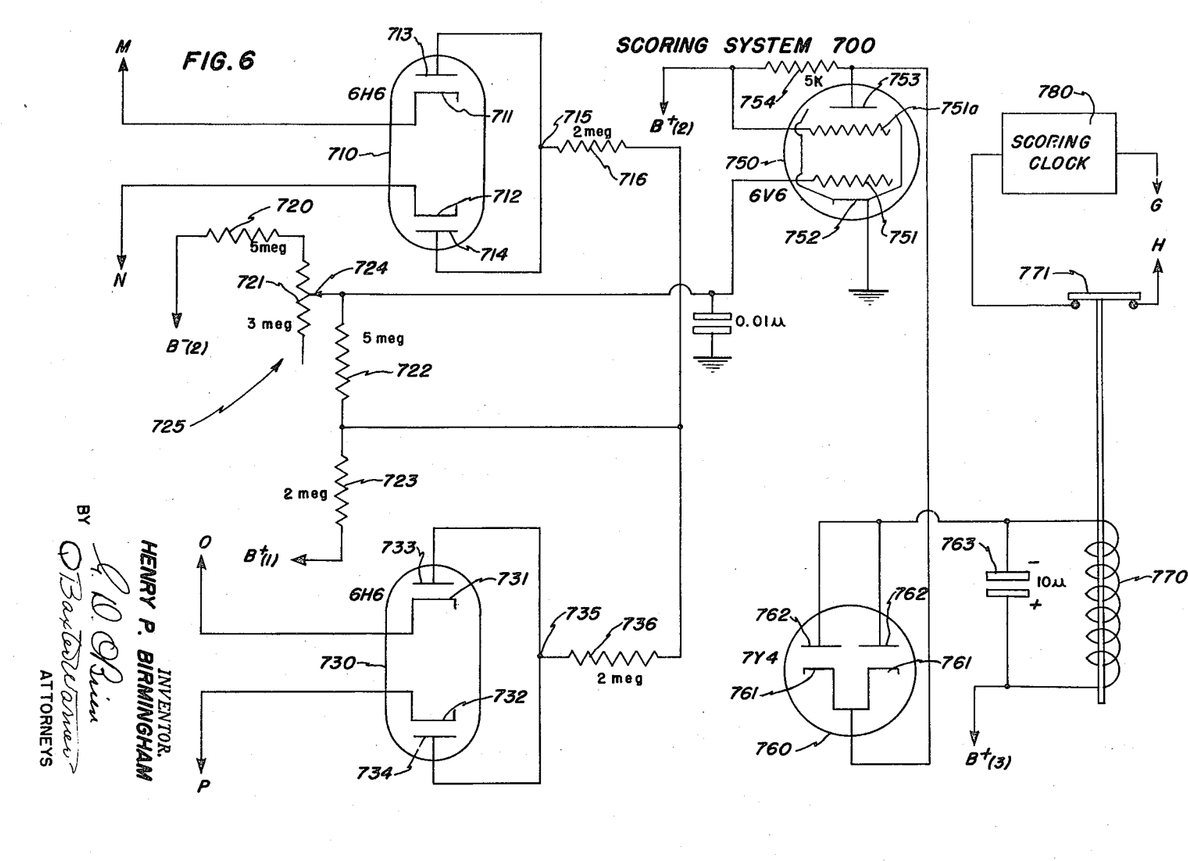

The voltages impressed at points M and N are applied to the cathodes 711 and 712 respectively of the twin diode 710, while the voltages impressed at points O and P are applied to the cathodes 731 and 732 respectively of the twin diode 730. The plate voltages of the tubes 710 and 730 are combined and operate to control the beam power amplifier tube 750 comprising the plate 753, cathode 752, control grid 751 and screen grid 751a, which in turn operates the solenoid 770 through the one-way control tube 760. So long as the combined train and elevation tracking error signals are small, the relay 770 is energized to close the switch 771 operating the scoring clock 780, but when the combined tracking error signals exceed a predetermined amount, as indicated hereinabove, the solenoid 770 is deenergized to open the switch 771 stopping the scoring clock 780, thus permitting a determination of the accuracy of the trainee's tracking over a period of time.

Considering the scoring system in detail, a B—(2) and the B+(1) potentials are applied across the voltage dividing network comprising the resistors 720, 721, 722, and 723, from which a desired potential is tapped and applied to the plates 713, 714, 733, and 734 of the tubes 710 and 730 more positive than that impressed upon the cathodes 711, 712, 731, and 732 thereof from the points M, N, O, and P. A desired bias is placed on the grid 751 of the beam power amplifier 750, as determined by the position of the tap 724 on the resistor 721, to make the grid 751 negative with respect to the grounded cathode 752 and to cause a desired current to flow from the cathode 752 to the anode 753 thereof connected to the B+(2) potential source through resistor 754. The resultant plate current through the plate load resistor 754 establishes the cathodes 761 of the duo-diode control tube 760 at a more negative potential than the plates 762 thereof, connected through the solenoid coil 770 to a B+(3) plate supply, thus energizing the relay 770 to close the switch 771 and hence operate the scoring clock 780.

Considering in detail the operation of the tube 710 and its effect upon the voltage network operating to control the bias on the grid 751, the plates 713 and 714 thereof are tied together and hence must always be at the same potential. Prior to any train tracking error signal at points M and N, the cathodes 711 and 712 are established at the same potential, negative with respect to that impressed upon the plates 713 and 714, causing a current flow in the plate circuit. Since the plate load resistor 716 is very large as compared with the internal resistance of the tube 710, the plates 713 and 714 are caused to ride at a potential just slightly more positive than that impressed upon the cathodes of the tube and the potential at point 715 is equal thereto. Upon the occurrence of a train tracking error signal, the potential on one of the cathodes shifts in a negative direction while the other shifts in a positive direction, and the more negative cathode controls the plate potential to make it shift in the negative direction in accordance therewith, hence causing the potential at point 715 to shift correspondingly in a negative direction and cutting off the flow of electrons from the more positive cathode to its plate. This negative potential shift is combined with the B—(2) and B+(1) potentials in the above-mentioned voltage divider network to correspondingly shift the potential on the control grid 751 of the amplifier tube 750, and as the train tracking error increases the grid 751 is caused to shift correspondingly more negative. As grid 751 rides more negative, the flow of electrons from the cathode 752 to the plate 753 is accordingly decreased, causing the potential on plate 753 to shift in a positive direction. Since the cathodes 761 of the control tube 760 are tied to the plate 753 of tube 750, the potential thereon correspondingly shifts in a positive direction. As the train tracking error continues to increase, the potential difference between the cathodes 761 and plates 762 diminishes to the cut off value of the tube 760, thereby deenergizing the relay 770 to stop the scoring clock 780. Thus, when the train tracking error signal exceeds a predetermined amount as established by the interrelation of the operating voltage supplies and values of the elements in the present scoring system, the scoring clock is stopped to indicate that the trainee is not tracking the imaginary target accurately. The action of the tube 730 upon this circuit is identical to that of the tube 710, but operates in response to the elevation amplifier tube 330 to establish an accurate elevation tracking error limit in response to the potential difference existing between the points O and P.

When both train and elevation tracking errors are present, the two tubes 710 and 730 continue to operate in the same manner as described above, but the potentials at point 715, representing train tracking error, and at point 735, representing elevation tracking error, are combined in the voltage divider network 725, and it is the combined potential which acts upon the remainder of the scoring system circuit in the same manner as for the individual tube action. The ideal situation for scoring accurate tracking would be to define the accurate tracking area as a circular area described on the cathode ray tube screen within and concentric with the tracking reticle. The means here employed for combining the train and elevation tracking error signals is such as to approximate that ideal condition by defining the accurate tracking area in substantially the shape of a regular octagon with the zero tracking error position of the tracking spot located equidistant from its apexes. This is accomplished by making the three plate load resistors 716, 723, and 736 of equal value and each being greatly in excess of the internal resistance of the tubes 710 and 730. If resistors 716 and 736 were made very small with respect to the resistors 723, the larger of the two potentials carried at points 715 and 735 would completely control variations in the bias of the control grid 751, and would therefore result in an accurate tracking area on the cathode ray tube screen being defined substantially in the form of a square, registering inaccurate tracking only when either the train or elevation tracking error became so great as to exceed the established limit, although smaller tracking errors in train and elevation when combined would indicate inaccurate tracking on the cathode ray tube screen if the accurate tracking area is there defined as a circle. On the other hand, if resistors 716 and 736 are made very large with respect to resistor 723, the combined train and elevation tracking error signals would be completely additive to register faulty tracking on the scoring clock while the spot on the cathode ray tube screen would still be within a circular accurate tracking area. The area defined by such an additive system would be substantially in the form of a diamond with its apexes located midway between the apexes of the above-mentioned square area. However, if resistors 716, 736, and 723 are all made equal, a compromise is obtained between these areas. Such is the situation in the present scoring system, and the potentials obtained at points 715 and 735 as a result of train and elevation tracking errors are combined in such a manner as to control the scoring system to indicate accurate tracking so long as the cathode ray beam spot on the cathode ray tube screen remains within an area defined substantially in the form of a regular octagon. By adjustment of tap 724 on the resistor 721, various octagonal areas may be defined to describe the limits of accurate tracking so far as the operation of the scoring clock is concerned. When the combined potentials carried by the plates of tubes 710 and 730 exceed a predetermined value, as determined by the position of this tap, such that the combined train and elevation tracking error is sufficient to deflect the cathode ray beam spot outside the accurate tracking limit defined by the scoring system, the control grid 751 of the amplifier 750 is impressed with a sufficiently negative potential to cut off conduction through the control tube 760, and hence the relay 770 is deenergized to stop the operation of the scoring clock 780. Thus, there is presented a scoring system which determines an accurate tracking area on the cathode ray tube screen substantially in the form of a regular octagon, approximating the ideal condition of a circular area, and which operates to control a scoring clock to indicate the portion of a period of time that the trainee has obtained accurate tracking of the imaginary target course, or the portion of a period of time that the trainee has followed the imaginary target course with sufficient accuracy to keep the cathode ray beam spot within the accurate tracking area defined by the scoring system.

Considering the control tube 760 and its operation in detail, a B+ potential from the B+(3) supply is impressed upon its plates 762 through a plate load resistor comprising the coil of the relay 770, while its cathodes 761 are impressed with the potential carried by the plate 753 of the amplifier tube 750. The purpose of this control tube is two-fold: first, since the relay 770 can operate when current flows through its coil in either direction, tube 760 operates as a one-way valve or rectifier to permit energization of this coil only when the plate 753 of tube 750 is a determined amount more negative than the B+ potential on plates 762 and to prevent energization of the coil when the plate 753 becomes more positive than that B+ potential, as is obviously necessitated by the operation of the present scoring system; second, this control tube further functions, to limit the effective activity of the amplifier tube 750 to the linear portion of its plate current-voltage characteristic curve, and this is accomplished through a proper selection of values for the B+(2) supplies, for by establishing the proper voltage differential between B+(1) and B+(2) the conduction potential range for the cathodes 761 of tube 760 are established to line on the linear portion of the plate current-voltage characteristic curve for the amplifier tube 750. The condenser 763 is connected across the solenoid 770 to filter the current flowing in the plate circuit of tube 760.

A suggested set of values and types for the various components of the several units comprising the present instrument are indicated on the drawings, and an operative set of voltage supplies therefor are B+(1) 300 volts, B+(2) 300 volts, B+(3) 225 volts, B+(4) 350 volts, B−(1) −300 volts, and B−(2) −300 volts, thus presenting one complete and operative embodiment of the present instrument. However, it is not intended to limit the scope of the present invention to the values and characteristics thus indicated, nor to the precise embodiment herein described, but modifications of this invention within the spirit and scope thereof, as defined by the appended claims, will be apparent to those skilled in the art and are within the contemplation of the present patent.

What is claimed is:

1. A circuit for measuring the time duration that the deflection of a cathode ray beam is maintained within a substantially octagonal area on the screen of a cathode ray tube comprising, two twin diode vacuum tubes for detecting potential differences between opposite beam deflecting plates of the cathode ray tube, the two cathodes of each vacuum tube being responsive to the potential difference between each pair of opposite beam deflecting plates, the two plates of each vacuum tube being tied to each other, the two pairs of plates being united through two resistors into a single plate circuit, a third resistor interposed in the unitary plate circuit, said three resistors having substantially equal resistance values and each being far in excess of the internal resistance of each of said vacuum tubes, an amplifier vacuum tube, the combined plate potentials of said twin diodes existing between said first two and said last-mentioned resistors acting upon the control grid potential of said amplifier tube, a rectifier vacuum tube having its cathode potential and hence its conductivity controlled by the plate of said amplifier, the plate power supply voltages for said amplifier and rectifier being chosen to provide a cut-off cathode potential for the rectifier located on the straight line portion of the amplifier plate current voltage curve, the combination of the two potential differences between the two opposite pairs of beam deflecting plates thus controlling the conductivity of said rectifier and resulting in a conductive rectifier so long as insufficient to deflect the cathode beam out of a substantially octagonal area on the cathode ray tube screen, and means cooperating with the plate circuit of said rectifier for measuring the accumulated duration of its conductive periods.

2. A circuit for measuring the time duration that the deflection of a cathode ray beam is maintained within a substantially octagonal area on the screen of a cathode ray tube comprising, two pairs of substantially matched diode vacuum tubes for detecting potential differences between opposite beam deflecting plates of the cathode ray tube, the two cathodes of each pair of vacuum tubes being responsive to the potential difference between each pair of opposite beam deflecting plates, the two plates of each pair of vacuum tubes being tied to each other, the two pairs of plates being united through two resistors into a single plate circuit, a third resistor interposed in the unitary plate circuit, said three resistors having substantially equal resistance values and each being in excess of the internal resistance of each of said pairs of vacuum tubes, an amplifier, the thus combined plate potentials of said twin diodes controlling the output potential of said amplifier, a one-way valve or rectifier vacuum tube having its cathode potential and hence its conductivity controlled by the output potential of said amplifier, the power supply voltages for said amplifier and rectifier being chosen to provide a cut-off cathode potential for the rectifier located on the straight line portion of the amplifier plate current voltage curve, the combination of the two potential differences between the two opposite pairs of beam deflecting plates thus controlling the conductivity of said rectifier and resulting in a conductive rectifier so long as insufficient to deflect the cathode beam out of a substantially octagonal area on the cathode ray tube screen, and means cooperating with the plate circuit of said rectifier for measuring the accumulated duration of the conductive periods thereof.

3. A circuit for measuring the time duration that the deflection of a cathode ray beam is maintained within a substantially octagonal area on the screen of a cathode ray tube comprising, two pairs of substantially matched diode vacuum tubes for detecting potential differences between opposite beam deflecting plates of the cathode ray tube, the two cathodes of each pair of vacuum tubes being responsive to the potential difference between each pair of opposite beam deflecting plates, the two plates of each pair of vacuum tubes being tied to each other, the two pairs of plates being united through two resistors into a single plate circuit, a third resistor interposed in this unitary plate circuit, said three resistors having substantially equal resistance values and each being in excess of the internal resistance of each of said pairs of vacuum tubes, an amplifier, means connecting the common junction of said three resistors to a control grid of said amplifier in response to a deflection voltage appearing at one of said diodes sufficient to deflect the cathode ray beam outside of said octagonal area, and an electrical time measuring means in the plate circuit of said amplifier operative during the conductive period of said amplifier.

4. A circuit for measuring the time duration that the deflection of a cathode ray beam is maintained within a substantially polygonal area on the screen of a cathode ray tube comprising, two pairs of diode vacuum tubes for detecting potential differences between opposite beam deflecting plates of the cathode ray tube, the two cathodes of each pair of vacuum tubes being responsive to the potential difference between each pair of opposite beam deflecting plates, the two plates of each pair of vacuum tubes being tied to each other, the two pairs of plates being united through two resistors into a single plate circuit, a third resistor interposed in this unitary plate circuit, said three resistors having resistance values chosen to provide combined plate potentials of said two pairs of diodes of substantially constant values for traces of the cathode ray beam on the cathode ray tube screen within said polygonal area, an amplifier having a control grid connected to the junction of said three resistors to render said amplifier conducting in response to the combined substantially constant plate potential of said pairs of diodes, and means in the plate circuit of said amplifier for measuring the duration of its conductive periods.

5. In combination with a cathode ray tube having two pairs of deflection plates, a circuit for measuring the time duration that the cathode ray deflection is within a confined area on the screen thereof comprising, a pair of amplitude sensitive means each connected across one pair of deflection plates, a normally conducting vacuum tube having a bias control circuit therefore, means connecting said pairs of amplitude sensitive means additively to said bias circuit to interrupt conduction in said vacuum tube in response to excessive deflection voltages, and electrical time measuring registering means, and a relay in the plate circuit of said vacuum tube for controlling said time registering means.

References Cited in the file of this patent

UNITED STATES PATENTS

| | | |
|---|---|---|
| 2,391,862 | Boyle | Jan. 1, 1946 |
| 2,399,661 | Bowie | May 7, 1946 |
| 2,406,751 | Emerson | Sept. 3, 1946 |
| 2,438,888 | Andrews | Apr. 6, 1948 |
| 2,471,315 | Dehmel | May 24, 1949 |
| 2,477,615 | Isbister | Aug. 2, 1949 |
| 2,492,356 | Cesareo | Dec. 27, 1949 |
| 2,507,590 | Clark | May 16, 1950 |
| 2,563,967 | Sherwin | Aug. 14, 1951 |
| 2,610,319 | Page | Sept. 9, 1952 |
| 2,624,043 | Gerwin et al. | Dec. 30, 1952 |
| 2,646,530 | Goodell | July 21, 1953 |